United States Patent [19]
Hartley

[11] Patent Number: 5,419,153
[45] Date of Patent: May 30, 1995

[54] METHOD AND APPARATUS FOR RIPENING FRUIT

[75] Inventor: Gerald Hartley, Stockport, England

[73] Assignee: Multiplex Contracts Limited, Cheshire, England

[21] Appl. No.: 174,480

[22] Filed: Dec. 28, 1993

[51] Int. Cl.⁶ .............................................. F25D 17/04
[52] U.S. Cl. ...................................... 62/408; 34/487; 99/468; 426/419
[58] Field of Search ................. 34/487; 426/418, 419; 99/468, 474, 475, 517; 62/408, 414, 89

[56] References Cited

U.S. PATENT DOCUMENTS

| | | | |
|---|---|---|---|
| 1,703,290 | 2/1929 | Buck | 34/487 X |
| 3,129,071 | 4/1964 | Meredith | 34/487 X |

FOREIGN PATENT DOCUMENTS

| | | |
|---|---|---|
| 254947 | 2/1988 | European Pat. Off. |
| 525842 | 2/1993 | European Pat. Off. |
| 1127619 | 9/1968 | United Kingdom |
| 89/01292 | 2/1989 | WIPO |
| 91/01094 | 2/1991 | WIPO |

*Primary Examiner*—William E. Wayner
*Attorney, Agent, or Firm*—Collard & Roe

[57] ABSTRACT

In a banana ripening room, pallets of boxes of fruit are stacked in individual locations defined by a support structure, in two spaced apart rows separated by an aisle, and in two superimposed tires. The aisle defines a volume into which air is introduced under pressure by fans in an overhead space separated from the room by a false ceiling. All the gaps between adjacent pallets and structural members are sealed by rubber flaps, an efficient seal being obtained when boxes are used which are designed for use in pressurised ripening systems. The flaps are attached along one edge to structural members and free at their other edges to conform to the contours of the pallet loads, thereby ensuring that air can be cycled only through the pallet loads to lower pressure zones beyond the rows of pallets.

9 Claims, 4 Drawing Sheets

METHOD AND APPARATUS FOR RIPENING FRUIT

This invention relates to a method and apparatus for ripening fruit.

BACKGROUND OF THE INVENTION

The invention concerns the construction and operation of fruit ripening rooms, principally but not exclusively for the ripening of bananas. Banana ripening rooms are used to ripen fruit which has been picked and shipped in an unripe state, to a marketable condition. This is achieved by passing air through boxes of fruit loaded on pallets stacked in the ripening room.

DESCRIPTION OF PRIOR ART

The customary layout and method used in banana ripening rooms is to arrange pallets, loaded with boxes of the fruit in stacks, first having rearranged the boxes on each pallet to allow for circulation of air between the boxes, and air is introduced to the room by blower fans to create an air circulation. This method is disadvantageous as each pallet has to be broken down, so that the fruit boxes are redisposed in a honeycomb. "Pressurised ripening" is an improvement on this system, as no handling of the pallet loads is required. This method is characterised by the fact that air is forced through the pallets by a system of fans, creating an over-pressure on one side of the pallet, and an under-pressure on the other side. There are two main pressurised ripening systems in use at present.

a) Tarpaulin System: Pallets are stacked in rows within the ripening room, and seals are provided by drawing tarpaulins over the tops and fronts of the pallets, and seals provided between the sides of adjacent pallets, so that the only path for air flow is through the boxes stacked on the pallets. Fans are arranged to draw air from the space between adjacent lines of pallets, so that air will flow from the outside through the pallets to the space.

b) Air-Bag System: In this system, air seals between pallets are formed by inflated air bags. Air is drawn upwardly from the central space by means of fans into a ceiling unit where it is conditioned and delivered downwardly via voids at the sides of the room.

Both the above systems entail problems with maintenance and hygiene. For example, the bags, often made of sail cloth, may become snagged and torn, as may the tarpaulins, and the bags are likely to attract mould growth. Air bags are awkward to inflate, and both present handling difficulties and are expensive to install and maintain. Also air bags are usually made of sail cloth or other breathable materials, and thus can hold moisture in their pores, thus promoting mould growth and hence further maintenance expense.

SUMMARY OF THE INVENTION

An object of the invention is to provide a method and apparatus for ripening fruit, with particular reference to the construction and operation of banana ripening rooms, which by using the principle of pressurised ripening, enables pallets to be handled without disturbing their loading, but which overcomes the problems arising from the tarpaulin and air bag systems, and particularly towards the reduction of the cost of construction, maintenance and hygiene, and to provide a method of providing effective seals using no moving parts apart from flaps.

The invention provides, from a first aspect, apparatus for ripening fruit, comprising a ripening room construction incorporating means for receiving a plurality of stacked loaded pallets in at least two spaced apart rows, with a volume defined between said rows, means defining a seal between said pallets and for sealingly enclosing said volume, fan means for introducing air into said volume to create an over-pressure in said volume, whereby air is allowed to leave said volume only by passing through said pallets to zones having a lower air pressure and separated from said volume by said rows of pallets and said sealing means.

From another aspect, the invention provides a method of ripening fruit, comprising placing said fruit in boxes loaded on pallets, in a ripening room, in at least two rows of said pallets defining a volume between said rows, introducing air under pressure into said volume, and sealing all gaps between adjacent pallets and structures so that air is forced to pass through said boxes on said pallets, to pass to zones of lower air pressure on the other sides of said rows.

Preferably, said sealing means comprise flexible flap means locatable or located to cover gaps between each pallet and an adjacent pallet or structure, said flexible flap means each comprising a strip of e.g. flexible plastics or rubber material, secured along one edge to a structural part of a pallet or frame structure, and free at the opposite edge to conform to the contours of any surface against which it is located, under the pressure of air in said volume.

Said flexible flap means preferably comprises a strip of flexible plastics or rubber material which tapers in thickness from a greater thickness at or adjacent said one edge which is secured to a structural part, to a lesser thickness at or adjacent said opposite free edge.

In a preferred embodiment, said flexible flap means may comprise a strip of rubber, of tapered cross-section, having a longitudinally extending bead attached to or extending along said one edge of greater thickness, for insertion into and removal from, a channel sectioned member with grooves so that said flap means may be replaced as desired.

The fan means may be located in an overhead space, separated from said volume by a false ceiling, to which access may be had for maintenance purposes without disturbance to said volume or its contents. The fan means may comprise a plurality of blower fans equi-spaced along the length of said volume.

An access walk may be provided in said volume at a height intermediate a floor thereof and said false ceiling, for safe access to an upper tier of said pallets.

DESCRIPTION OF DRAWINGS

A preferred embodiment of apparatus according to the invention is illustrated in the accompanying drawings, by way of example.

In the drawings.

DESCRIPTION OF PREFERRED EMBODIMENT

Figure 1:
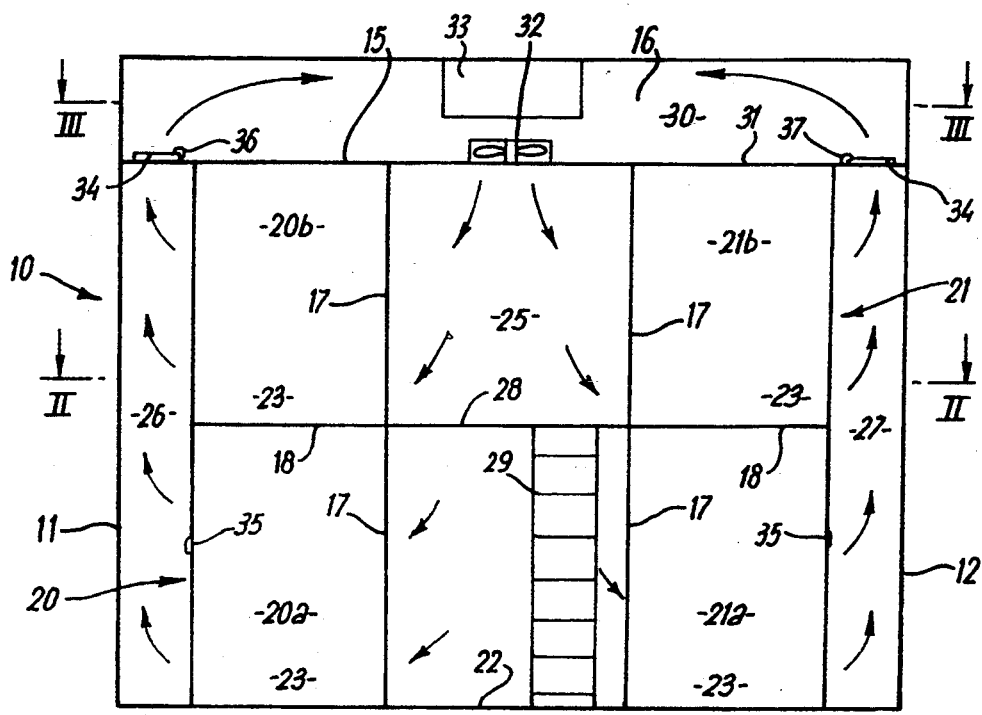
FIG. 1 is a diagrammatic transverse cross-sectional view of a banana ripening room according to the invention.
Figure 2:
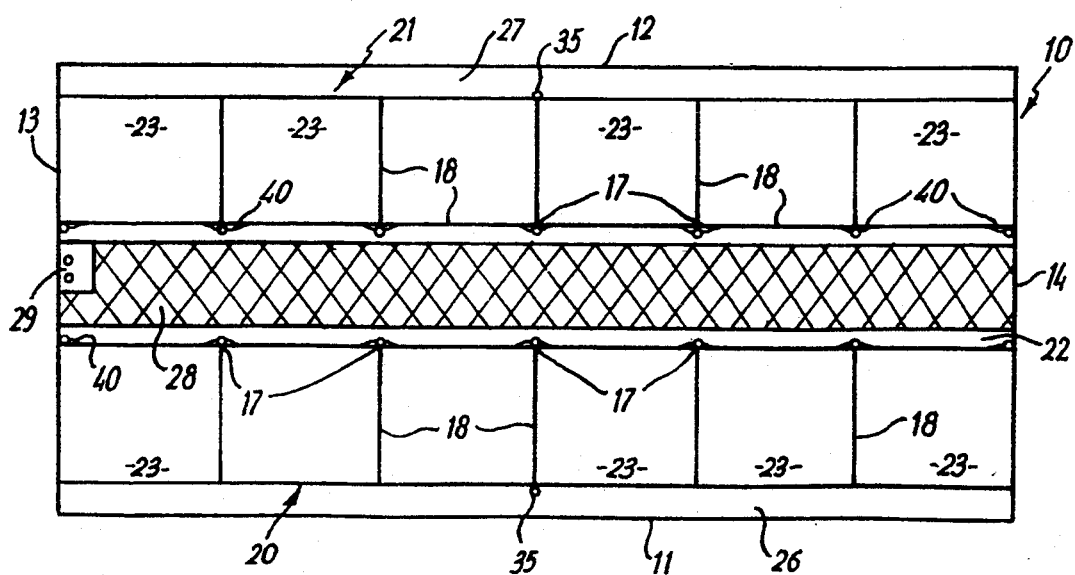
FIG. 2 is a plan view on line II—II of FIG. 1.
Figure 3:
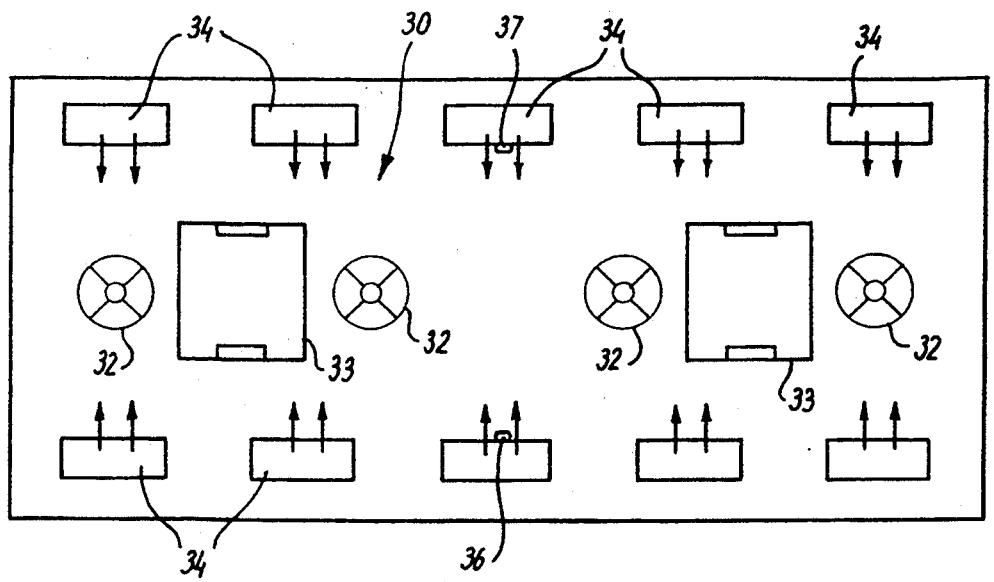
FIG. 3 is a plan view on line III—III of FIG. 1.
Figure 4:
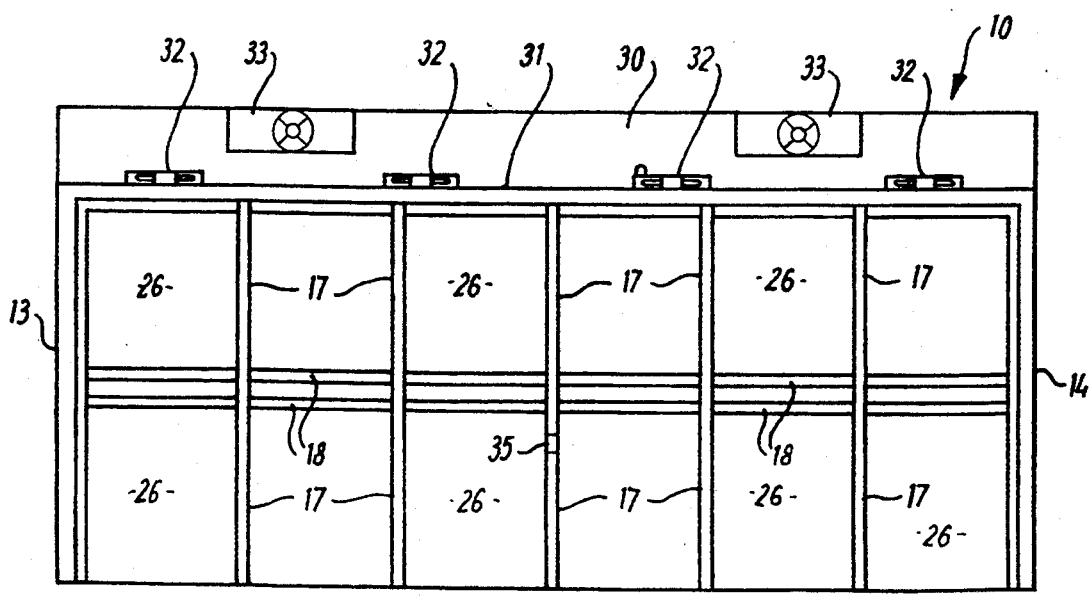
FIG. 4 is a longitudinal sectional view of the room according to the invention.
Figure 5:
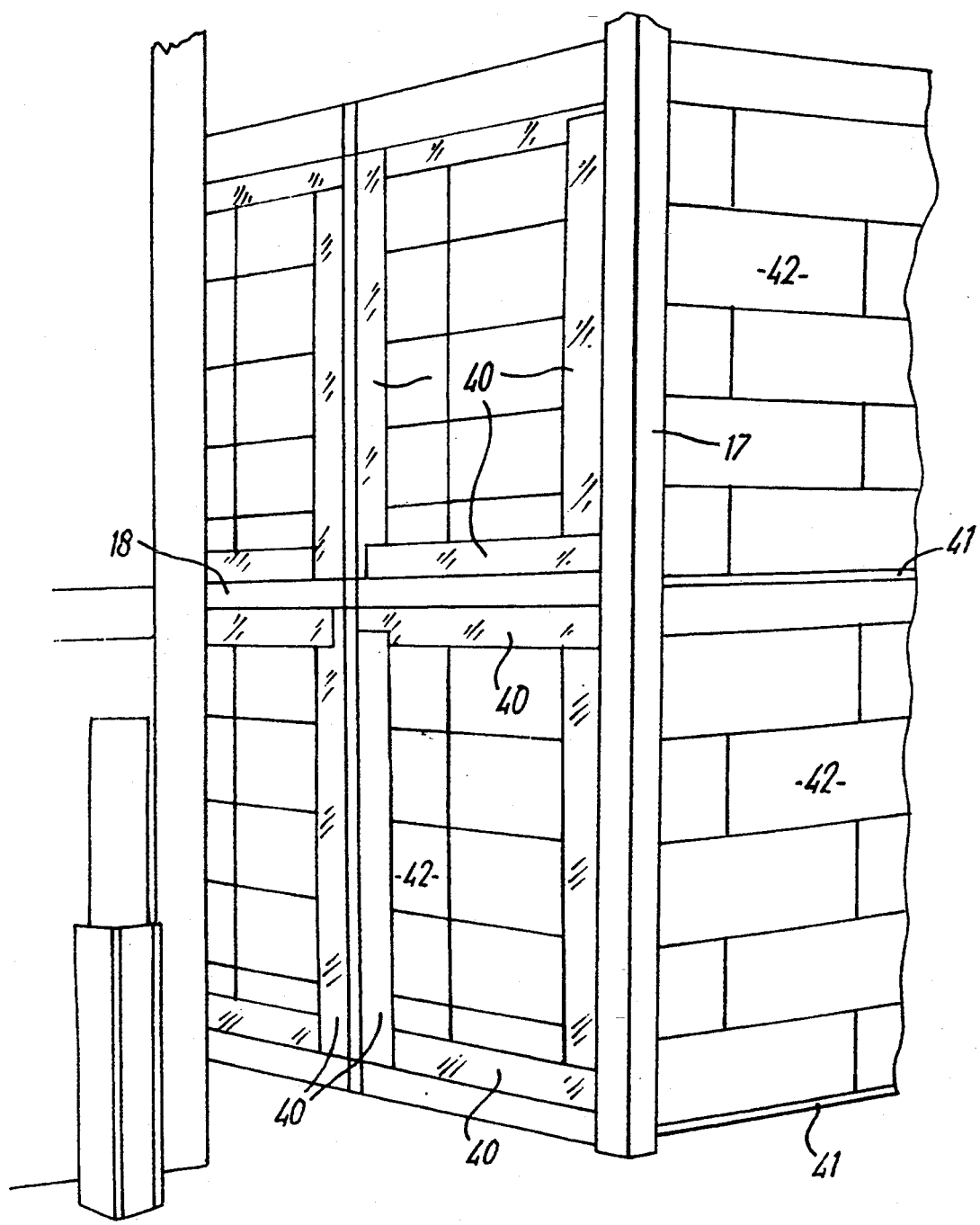
FIG. 5 is a perspective view from one end, showing pallets in place, and the location of sealing flaps.

Referring to the drawings, a fruit ripening room 10 is shown which is intended specifically for ripening of bananas, after they have been picked and bulk transported in an unripe state, to a state of sufficient ripeness to be marketed for consumption. The room is defined by side walls 11, 12, an end wall 13, and a door 14 which constitutes a further end wall which can be opened for access to the room for stacking and unstacking pallets loaded with fruit in boxes.

The walls are fabricated from panels having internal and external (relative to the room) skins of pre-stressed galvanised steel, finished with white food-safe polyester paint, laminated to an insulating core of polystyrene.

A false ceiling 15 is also provided and a space 16 enclosed thereby above and separate from the ripening room 10.

Steel frame work, comprising uprights 17 and horizontal members 18 is provided to support a plurality, e.g. up to twenty four pallets 19 in two rows 20, 21 one on either side of a central aisle 22, and each comprising two tiers, a lower tier 20a, 21a and an upper tier 20b, 21b. These form a plurality of locations 23, each adapted to receive a loaded pallet. The locations 23 are twenty four in number, six in each tier of each row. The aisle between the rows 20, 21 provides a volume 25, and a space 26, 27 is left between the outer sides of the rows and adjacent side walls 11, 12. A walk way 28 is provided in the aisle at the level of the upper tiers 20b, 21b, to which access is gained by a ladder 29 at the rear end of the aisle.

An upper volume 30 above the room 10 is partitioned off by a false ceiling 31, this volume 30 houses air circulating and conditioning apparatus, in the form of four blower fans 32 set in the false ceiling 31 in an equispaced row above the aisle, to blow air into the volume 25; and two evaporators 33 are used to adjust the temparature of the air as desired.

A plurality of air-return vents 34, e.g. five on each side, are located in the false ceiling above the spaces 26, 27 which are disposed on the outer sides fo rows 20, 21.

Sensors are provided at various points in the room, to control the operation of the air circulating and conditioning apparatus, in accordance with for example the instructions of a central data processor controlling a plurality of ripening rooms. The sensors comprise an ethylene sensor 35, located below the false ceiling 31, and air temperature sensors 36, 37 one located at an air return vent 34 at either side of the room.

Sealing means is provided in the form of a plurality of flexible sealing strips 40, each connected along one edge to a respective upright 17, or horizontal member 18. When pallets, such as 41, loaded with boxes of fruit 42 are stacked into there respective locations 23, the free edges of the strips can abut the faces of the stacked boxes 42. Further sealing strips can effect sealing between the uprights 17 and the end wall 13 and the door 14, the floor, and false ceiling 31 to completely seal the volume 25 contained by the aisle.

Figure 6:
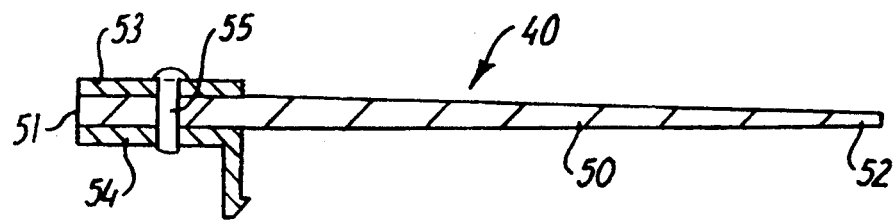
FIG. 6 is a sectional view of a sealing flap as used in the invention.
Figure 7:
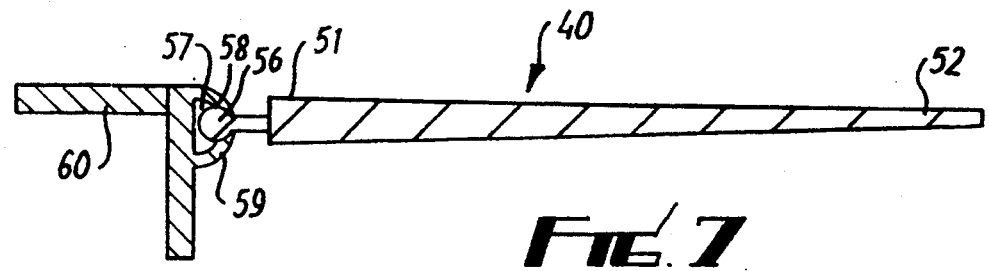
FIG. 7 is a sectional view of an improved sealing flap according to the invention.

FIGS. 6 and 7 are sectional views of two embodiments of sealing strips 40, which take the form of flexible flaps 50 of rubber or plastics, which taper in thickness from a thick edge 51 which is adapted to be secured to a structural member, such as an upright 17 or a horizontal member 18, to a thin free edge 52. In FIG. 6, the thicker edge 51 is shown as being clamped between a top strip 53, and an angled strip 54, and secured by rivets 55. Angled strip 54 is in turn secured to a structural member by screws etc. In FIG. 7, the thicker edge 51 has a bead 56 attached thereto, and this bead 56 is received in a channel 57, formed with resilient lips 58, 59 and formed in turn on an angled strip 60. The strip 60, and lips 58, 59 defining channel 57 are extruded as a unitary strip from e.g. aluminium, or ant other metal, or strong synthetic plastics material with the required strength and resilience.

Figure 8:
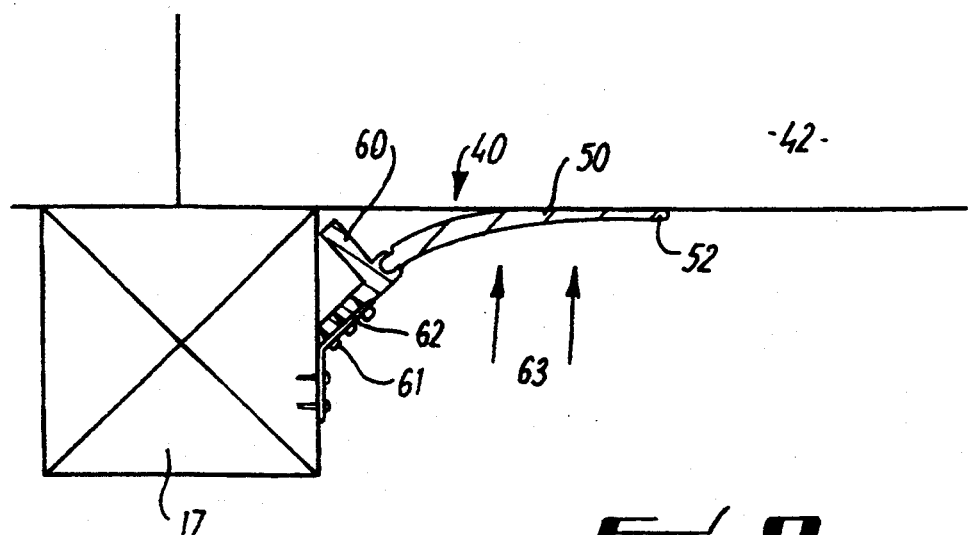
FIG. 8 is a sectional view showing the flap of FIG. 8, mounted on a support member.

FIG. 8 shows the sealing flap of FIG. 7 mounted on an upright support member 17. The strip 60 is mounted on the support member 17 by means of a hinge 61, one web 62 of which is secured to the upright 17. This enables the flap to be swung into and out of engagement with the surface of the boxes 42, for example for stacking and unstacking the pallets 41. The arrows 63 show the direction of air pressure forcing the flap against the boxes 42.

In operation, pallets 41, loaded with boxes of fruit 42 are stacked one in each location 23, using lift trucks, the door 14 being open. When stacking is completed, the door 14 is closed and sealed, and the air circulating apparatus activated. Individual pallets may be removed from the room, or the room not filled to capacity, any unoccupied space being filled with a removable board or blind to retain the seal.

The blower fans 32 blow air into the volume 25 provided by the aisle, and this creates an over-pressure in the volume 25. The over-pressure presses the free edges of the sealing strips 40 into contact with the boxes 42 etc. which they lie against, and this prevents the escape of pressurised air through the gaps between pallets, and between the framework and the end wall, floor, false ceiling and door. The pressurised air in the volume is thus constrained to pass by diffusion through the boxes, and circulate about fruit contained in the boxes, provided boxes designed for use in pressurised ripening are used, instead of taking any easier bypass route around the boxes. Air which has passed through the boxes then returns to the upper space 30 through the return vents 34, to be recirculated.

The evaporators 33 operate in accordance with the instructions of a controller influenced by the information provided by the sensors 35, 36 and 37 concerning air temparature and ethylene concentration, as does a condenser 38 also housed in space 30.

The apparatus and method of the invention provide for efficient and cost effective sealing of the high pressure space and the capital costs of a ripening room is much reduced as compared with the airbag system. There are no moving parts apart from the flaps, and no parts likely to promote mould growth. The air circulating and conditioning apparatus can be accessed for repair and maintenance without disturbing the fruit stored in the ripening room, and the apparatus is suitable for centralised control by data-processor to ensure that ripening proceeds at a natural rate and that the room is notified as ready for clearance when ripening has proceeded to a suitable stage.

I claim:
1. Fruit ripening apparatus, comprising:
a) a ripening room construction;

b) framework means within said ripening room construction, comprised of horizontal and vertical framework members, and defining a plurality of pallet receiving locations, each for receiving a loaded pallet and defined by respective framework members;

c) said pallet receiving locations being disposed in at least two spaced apart rows with a volume or aisle space between said rows;

d) seal means defining a seal between each said pallet and each of said respective framework members, and also between other framework members and other means bounding said volume or aisle space;

e) means for introducing air under pressure into said volume or said aisle space, to create an over pressure in said volume, the air being allowed to leave said volume only by passing through said pallets to an external zone having lower pressure.

2. Apparatus according to claim 1, wherein said sealing means comprises flexible flap means locatable or located to cover gaps between each pallet, said flexible flap means each comprising a strip of flexible plastics or rubber material, secured along one edge to a structural part of a pallet or frame structure, and free at an opposite edge to conform to the contours of any surface against which it is located, under the pressure of air in said volume.

3. Apparatus according to claim 2, wherein said flexible flap means comprises a strip of flexible plastics or rubber material which tapers in thickness from a greater thickness at or adjacent said one edge which is secured or securable to a structural part, to a lesser thickness at or adjacent said opposite free edge.

4. Apparatus according to claim 2 wherein said flexible flap means comprises a strip of rubber of tapered cross-section, having a longitudinally extending bead attached to or extending along said one edge of greater thickness, for insertion into and removal from a channel sectioned member, so that said flap means may be replaced as necessary.

5. Apparatus according to claim 1, wherein said fan means is located in an overhead space separated from said volume by a false ceiling, and comprises a plurality of blower fans equispaced along the length of said volume.

6. Apparatus according to claim 5 wherein said overhead space also houses evaporators and a condenser.

7. Apparatus according to claim 5 wherein openings communicate between said zones and said overhead space to admit air from said zones to said space for recirculation.

8. Apparatus according to claim 5 including air temparature sensors and an ethylene sensor.

9. A method of ripening fruit, comprising placing said fruit in boxes loaded on pallets in a ripening room, in at least two rows of said pallets defining a volume between said rows; introducing air under pressure into said volume, and sealing all gaps between adjacent pallets and structures so that air is forced to pass through said boxes on said pallets to pass to zones on the other sides of said rows, having lower air pressure.

* * * * *